(12) United States Patent
Takaki

(10) Patent No.: US 9,574,526 B2
(45) Date of Patent: Feb. 21, 2017

(54) EXHAUST GAS RECIRCULATION CONTROL DEVICE AND EXHAUST GAS RECIRCULATION CONTROL METHOD FOR INTERNAL COMBUSTION ENGINE

(71) Applicant: NISSAN MOTOR CO., LTD., Yokohama-shi, Kanagawa (JP)

(72) Inventor: Daisuke Takaki, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/763,933

(22) PCT Filed: Dec. 24, 2013

(86) PCT No.: PCT/JP2013/084414
§ 371 (c)(1),
(2) Date: Jul. 28, 2015

(87) PCT Pub. No.: WO2014/119182
PCT Pub. Date: Aug. 7, 2014

(65) Prior Publication Data
US 2015/0361872 A1 Dec. 17, 2015

(30) Foreign Application Priority Data
Feb. 1, 2013 (JP) ................................ 2013-017986

(51) Int. Cl.
*F02B 37/16* (2006.01)
*F02D 21/08* (2006.01)
*F02D 41/00* (2006.01)

(52) U.S. Cl.
CPC .............. *F02M 26/06* (2016.02); *F02B 37/16* (2013.01); *F02D 21/08* (2013.01); *F02D 41/0077* (2013.01); *F02M 26/28* (2016.02); *F02M 26/49* (2016.02); *F02D 41/0065* (2013.01); *F02D 2041/0017* (2013.01); *Y02T 10/144* (2013.01)

(58) Field of Classification Search
CPC ......... F02M 26/49; F02M 26/06; F02B 37/16; F02D 21/08
USPC ............... 123/568.11, 568.16, 568.19, 559.1
See application file for complete search history.

(56) References Cited

U.S. PATENT DOCUMENTS

2011/0023829 A1\* 2/2011 Miyashita ........... F02D 41/0087
123/445
2011/0253111 A1\* 10/2011 Pursifull ................. F02B 21/02
123/559.1
(Continued)

FOREIGN PATENT DOCUMENTS

EP    0 892 165 B1    1/2006
JP    9-25852 A       1/1997
(Continued)

*Primary Examiner* — Mahmoud Gimie
(74) *Attorney, Agent, or Firm* — Foley & Lardner LLP

(57) ABSTRACT

When an EGR control valve is fixed and a valve opening degree EGRVO of the EGR control valve is greater than a valve-opening threshold value EGRVOth, a limit value Qlim of the intake air amount is set to a prescribed amount Qlim1. Conversely when the EGR control valve is fixed and the valve opening degree EGRVO of the EGR control valve is less than or equal to the valve-opening threshold value EGRVOth, the limit value Qlim of the intake air amount is set to a prescribed amount Qlim2.

7 Claims, 3 Drawing Sheets

(56) References Cited

U.S. PATENT DOCUMENTS

| | | | |
|---|---|---|---|
| 2012/0037134 A1* | 2/2012 | Jankovic | ............ F02D 41/0002 |
| | | | 123/568.21 |
| 2012/0130623 A1 | 5/2012 | Ide et al. | |
| 2013/0333665 A1* | 12/2013 | Pursifull | ................ F02B 37/04 |
| | | | 123/399 |

FOREIGN PATENT DOCUMENTS

| | | |
|---|---|---|
| JP | 2005-207285 A | 8/2005 |
| JP | 2009-264149 A | 11/2009 |
| JP | 2010-255602 A | 11/2010 |
| RU | 112 280 U1 | 1/2012 |
| RU | 2 465 484 C2 | 10/2012 |

* cited by examiner

EXHAUST GAS RECIRCULATION CONTROL DEVICE AND EXHAUST GAS RECIRCULATION CONTROL METHOD FOR INTERNAL COMBUSTION ENGINE

TECHNICAL FIELD

The present invention relates to an exhaust gas recirculation control device and an exhaust gas recirculation control method for an internal combustion engine, for recirculating part of exhaust gas back to the upstream side of a supercharger.

BACKGROUND ART

On internal combustion engines configured to recirculate exhaust gas, whose recirculation amount depends on an operating condition, back to the intake system, such internal combustion engines, which are configured to diagnose a failure in an EGR control valve disposed in an EGR passage for recirculating exhaust gas from the exhaust system to the intake system, are well known.

For instance, Patent document 1 discloses a technology in which a failure diagnosis for an EGR control valve, which is disposed in an EGR passage configured to connect an exhaust passage and an intake passage, is performed. As a result of the failure diagnosis, when it is determined that an open failure, in which the EGR control valve has been fixed in its open state, is occurring, fail-safe control is executed for limiting an output of the internal combustion engine.

In this Patent document 1, by virtue of execution of the above-mentioned fail-safe control, it is possible to avoid high output operation of the internal combustion engine when the EGR control valve has been fixed in the open state. Hence, there is a less tendency for the EGR control valve and the intake system to be excessively heated owing to high temperature EGR gas, and thus it is possible to prevent a secondary failure in the EGR control valve and a deterioration in performance of the internal combustion engine.

However, in the Patent document 1 there is a problem that it is impossible to prevent an engine stall, which may occur owing to a deterioration in combustion and/or a misfire caused by an excessive EGR (exhaust-gas-recirculation) rate resulting from the EGR control valve fixed or stuck in the open state.

CITATION LIST

Patent Literature

Patent document 1: Japanese Patent Provisional Publication No. JP09-025852

SUMMARY OF INVENTION

It is, therefore, in view of the previously-described problem, the invention is characterized in that, in an exhaust gas recirculation apparatus for an internal combustion engine configured to recirculate exhaust gas of an amount corresponding to a valve opening degree of an EGR control valve when an intake air amount becomes greater than a prescribed amount and to recirculate a less amount of exhaust gas regardless of the valve opening degree of the EGR control valve when the intake air amount becomes less than or equal to the prescribed amount, a limit is imposed on the intake air amount so as not to fall the internal combustion engine into a misfire state when the EGR control valve has been fixed.

According to the invention, a limit on the intake air amount is imposed when it is determined that the EGR control valve has been fixed, and hence the amount of exhaust gas recirculating back to the intake system (that is, the EGR amount) reduces. Accordingly, a misfire of the internal combustion engine is prevented and thus it is possible to avoid an engine stall and also to avoid the internal combustion engine from falling into a startup disabled state.

DESCRIPTION OF EMBODIMENTS

Figure 1:
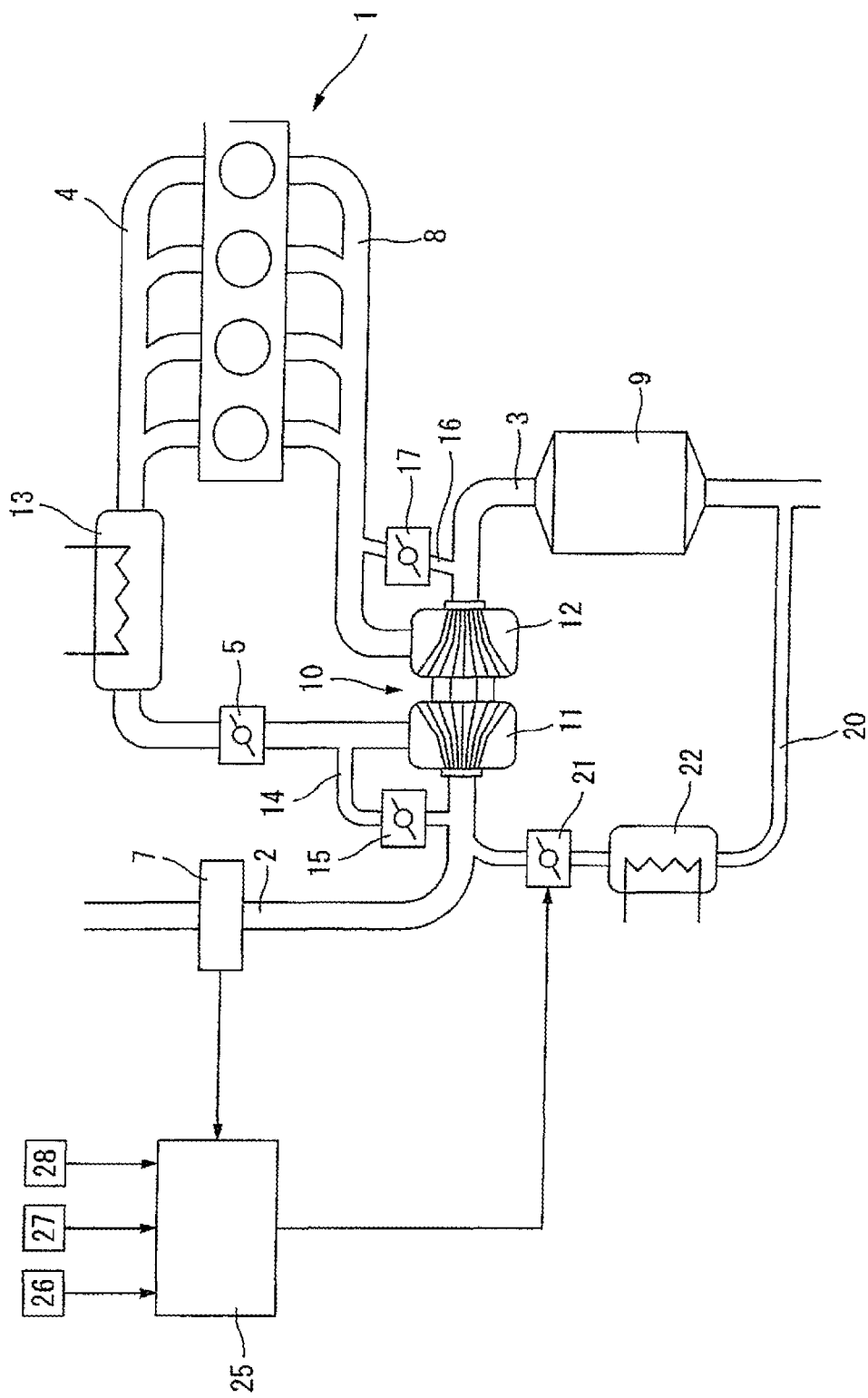
FIG. 1 is a system block diagram illustrating the overall system configuration of an internal combustion engine to which the invention is applied.

The embodiments of the present invention are hereinafter described with reference to the drawings. Referring to FIG. 1, there is shown the overall system configuration of an internal combustion engine 1 to which the invention is applied.

Internal combustion engine 1 is mounted on a vehicle, such as an automotive vehicle, as a driving power source. An intake passage 2 and an exhaust passage 3 are connected to the internal combustion engine. A throttle valve 5 is disposed in the intake passage 2, which is connected to the internal combustion engine 1 through an intake manifold 4. An airflow meter 7 is disposed on the upstream side of the intake passage for detecting an intake air amount. An exhaust catalyst 9, such as a three-way catalyst, is disposed in the exhaust passage 3, which is connected to the internal combustion engine 1 through an exhaust manifold 8, for purifying exhaust gases.

Also, internal combustion engine 1 has a turbo supercharger 10 equipped with a compressor 11, which is placed in the intake passage 2, and a turbine 12, which is placed in the exhaust passage 3, the compressor and the turbine being coaxially arranged. Compressor 11 is located on the upstream side of throttle valve 5 and also located on the downstream side of airflow meter 7. Turbine 12 is located on the upstream side of exhaust catalyst 9. By the way, in FIG. 1, reference sign 13 denotes an intercooler located on the downstream side of throttle valve 5.

A recirculation passage 14, which is configured to connect the upstream side and the downstream side of the compressor, bypassing the compressor 11, is connected to the intake passage 2. A recirculation valve 15 is disposed in the recirculation passage 14 for controlling a flow rate of intake air flowing through the recirculation passage 14.

An exhaust bypass passage 16, which is configured to connect the upstream side and the downstream side of the turbine 12, bypassing the turbine 12, is connected to the exhaust passage 3. A waste gate valve 17 is disposed in the exhaust bypass passage 16 for controlling a flow rate of exhaust gas flowing through the exhaust bypass passage 16.

Furthermore, in the internal combustion engine 1, exhaust gas recirculation (EGR) can be performed. An EGR passage 20 is provided between the exhaust passage 3 and the intake passage 2. One end of EGR passage 20 is connected to the exhaust passage 3 downstream of the exhaust catalyst 9, while the other end is connected to the intake passage 2 downstream of the airflow meter 7 and upstream of the compressor 11. An EGR control valve 21 and an EGR cooler 22 are both disposed in the EGR passage 20. The valve opening degree of EGR control valve 21 is controlled by a control unit 25 for obtaining a given EGR rate which depends on an operating condition.

Detection signals from a sensor group including a crankangle sensor 26 for detecting a crankangle of a crank shaft (not shown), an accelerator opening sensor 27 for detecting an amount of depression of an accelerator pedal (not shown), an EGR control valve opening sensor 28 for detecting a valve opening degree of EGR control valve 21 and the like, as well as a detection signal from airflow meter 7 are inputted to control unit 25.

Responsively to these detection signals, control unit 25 executes intake-air amount control, ignition timing control, and air/fuel ratio control of internal combustion engine 1, and also executes exhaust-gas-recirculation control (EGR control) for recirculating part of exhaust gas from the exhaust passage 3 back to the intake passage 2 by controlling the valve opening degree of EGR control valve 21 as discussed above. By the way, respective valve openings of throttle valve 5, recirculation valve 15, and waste gate valve 17 are controlled by the control unit 25. Instead of controlling the opening/closing of the recirculation valve by the control unit 25, a so-called check valve, which is opened only when the pressure of the downstream side of compressor 11 reaches a predetermined pressure or more, may be used as the recirculation valve 15.

The above-mentioned internal combustion engine 1 is configured to recirculate part of exhaust gas from the downstream side of turbine 12 to the upstream side of compressor 11 as EGR gas. In a steady state, an EGR rate is determined basically by the valve opening degree (the opening ratio) of EGR control valve 21.

Figure 2:
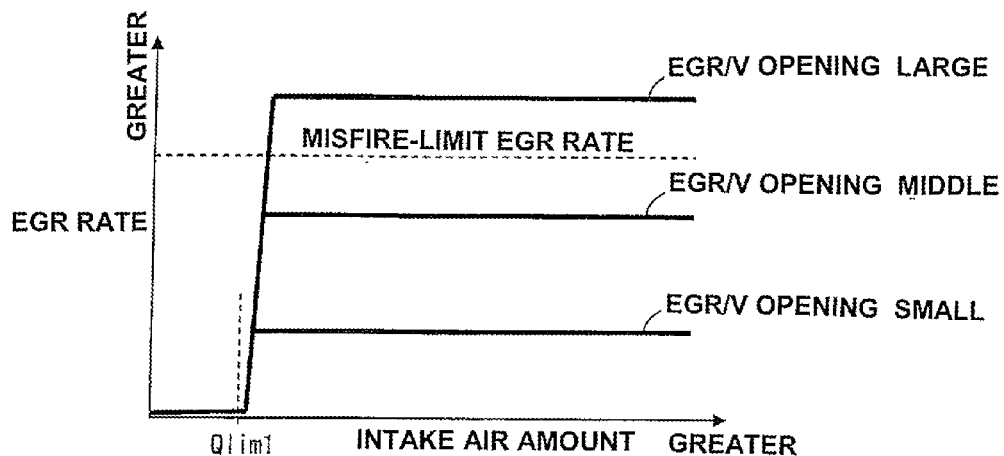
FIG. 2 is an explanatory view schematically illustrating the correlation between an intake air amount and an EGR rate.

In more detail, in the above-mentioned internal combustion engine 1, as shown in FIG. 2, when the intake air amount becomes greater than a prescribed amount Qlim1, the EGR rate is determined only by the valve opening degree of EGR control valve 21, regardless of whether the intake air amount is large or small. Conversely when the intake air amount becomes less than or equal to the prescribed amount Qlim1 and reaches a very small amount, there is a less exhaust gas recirculated (a less EGR gas), regardless of the valve opening degree of EGR control valve 21. Hence, the EGR rate becomes approximately zero.

Referring to FIG. 2, there is shown the correlation between the intake air amount and the EGR rate, with the valve opening degree of EGR control valve 21 adjusted to each of three different valve opening degrees (that is, large, middle, and small openings). By the way, with the relatively largest valve opening degree of these three valve opening degrees in FIG. 2, the EGR rate exceeds a predetermined misfire-limit EGR rate at which internal combustion engine 1 misfires, when the intake air amount becomes greater than the prescribed amount Qlim1. Also, with the middle valve opening degree of these three valve opening degrees in FIG. 2 and with the relatively smallest valve opening degree of these three valve opening degrees, the EGR rate becomes less than the misfire-limit EGR rate in a steady state, even when the intake air amount becomes greater than the prescribed amount Qlim1.

Hereupon, suppose that EGR control valve 21 has been stuck or fixed and then the intake air amount becomes greater than the prescribed amount Qlim1 with the fixed valve opening degree of the sticking or fixing EGR control valve. Under this condition, when the EGR rate becomes less than the misfire-limit EGR rate, the internal combustion engine never falls into a misfire state in a steady state.

However, even though, on the one hand, a decrease in the intake air amount occurs owing to the reduced valve opening degree of throttle valve 5 during a deceleration condition, on the other hand, in the exhaust system, exhaust pressure immediately before the deceleration condition tends to be maintained for a brief moment owing to a response delay of exhaust gas. Even when the valve opening degree of EGR control valve 21 is kept constant at that moment, the EGR amount tends to relatively increase and thus the EGR rate also tends to become temporarily large.

That is to say, although the valve opening degree of EGR control valve 21 has been fixed to such a valve opening degree that the EGR rate becomes less than the misfire-limit EGR rate under a steady state, there is a possibility that the EGR rate temporarily becomes greater than the misfire-limit EGR rate under a transient state such as deceleration and thus the internal combustion engine 1 misfires.

In contrast, when the intake air amount becomes greater than the prescribed amount Qlim1 with the fixed valve opening degree of the fixing EGR control valve 21 and the EGR rate becomes greater than or equal to the misfire-limit EGR rate, the internal combustion engine 1 tends to misfire owing to the intake air amount greater than the prescribed amount Qlim1 even in a steady state.

Therefore, in the present embodiment, when EGR control valve 21 has been fixed, the EGR rate of internal combustion engine 1 is controlled so as not to exceed the misfire-limit EGR rate even during deceleration by imposing a limit on the intake air amount and by reducing the amount of exhaust gas recirculating hack to the intake passage 2 (that is, the EGR amount).

That is, when EGR control valve 21 has been fixed with a valve opening degree greater than a preset valve-opening threshold value EGRVOth (details will be described later), a limit value of the intake air amount is set to the prescribed amount Qlim1 such that an upper limit of the intake air amount becomes the prescribed amount Qlim1. Conversely when EGR control valve 21 has been fixed with a valve opening degree less than or equal to the valve-opening threshold value EGRVOth, the limit value of the intake air amount is set to a prescribed amount Qlim2 (details will be described later) such that the upper limit of the intake air amount becomes the prescribed amount Qlim2.

Hereupon, the above-mentioned valve-opening threshold EGRVOth corresponds to a valve opening degree with which the EGR rate becomes the misfire-limit EGR rate in a steady state when the intake air amount becomes greater than the prescribed amount Qlim1.

By the way, in FIG. 2, the prescribed amount Qlim1 is set to a value slightly less than such an intake air amount that the EGR rate begins to suddenly rise. This is because, strictly speaking, there is a possibility of the occurrence of an infinitesimal fluctuation in the actual intake air amount even in a steady state and hence the previously-noted setting is made to prevent the EGR rate from exceeding the misfire-limit EGR rate even when the intake air amount exceeds the prescribed amount Qlim1 owing to such an infinitesimal fluctuation in a steady state.

Figure 3:
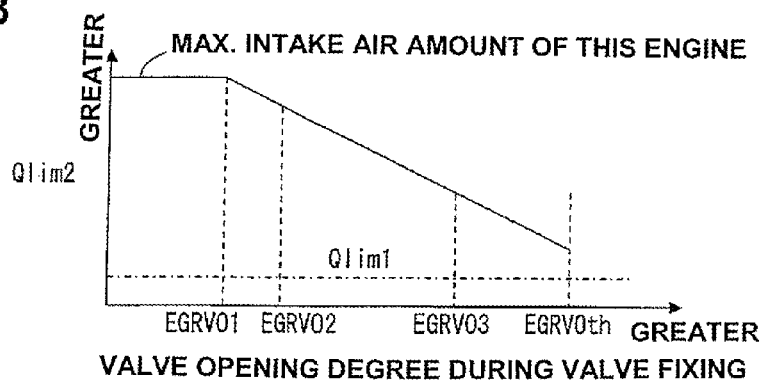
FIG. 3 is a prescribed amount Qlim2 calculation table.

On the other hand, the prescribed amount Qlim2 is set to a value greater than the prescribed amount Qlim1, and also set to decrease, as the valve opening degree of the fixing EGR control valve 21 increases. The prescribed amount Qlim2 is calculated, based on the valve opening degree of the fixing EGR control valve 21, from the prescribed amount Qlim2 calculation table as shown in FIG. 3, for instance.

As discussed previously, even with such a valve opening degree that the EGR rate becomes less than the misfire-limit EGR rate in a steady state, owing to a temporary rise in the EGR rate during deceleration there is a situation where the EGR rate during deceleration becomes greater than the misfire-limit EGR rate. The amount of temporary increase in the deceleration-period EGR rate correlates with a change in intake air amount, and also tends to increase, as a change in the deceleration-period intake air amount increases.

For the reasons discussed above, in the present embodiment, the prescribed amount Qlim2 is set to decrease, as the valve opening degree of the fixing EGR control valve 21 increases, taking into account a temporary increase in EGR rate in a transient state such as deceleration. That is, when the valve opening degree of the fixing EGR control valve 21 is such a valve opening degree that the EGR rate becomes less than the misfire-limit EGR rate under a steady state, a limit on the intake air amount is alleviated depending on the valve opening degree of the fixing EGR control valve 21.

In more detail, the prescribed amount Qlim2 is set to a maximum intake air amount of internal combustion engine 1 when the valve opening degree of the fixing EGR control valve 21 is less than or equal to a first valve opening degree EGRVO1 corresponding to a predetermined minute opening degree. That is, when the valve opening degree of the fixing EGR control valve 21 is a minute opening degree, a limit on the intake air amount is not performed practically. When the valve opening degree of the fixing EGR control valve 21 is greater than the first valve opening degree EGRVO1 and less than or equal to the valve-opening threshold value EGRVOth, the prescribed amount Qlim2 is set to be less than the maximum intake air amount of internal combustion engine 1, and also set to decrease, as the fixed valve opening degree increases. That is, when the valve opening degree of the fixing EGR control valve 21 is greater than the first valve opening degree EGRVO1 and less than or equal to the valve-opening threshold value EGRVOth, a limit on the intake air amount is performed.

By the way, the prescribed amount Qlim1 and the prescribed amount Qlim2 are set, taking account of different situations as discussed above. Hence, these prescribed amounts are discrete when the valve opening degree of the fixing EGR control valve 21 is the valve-opening threshold value EGRVOth.

Figure 4:
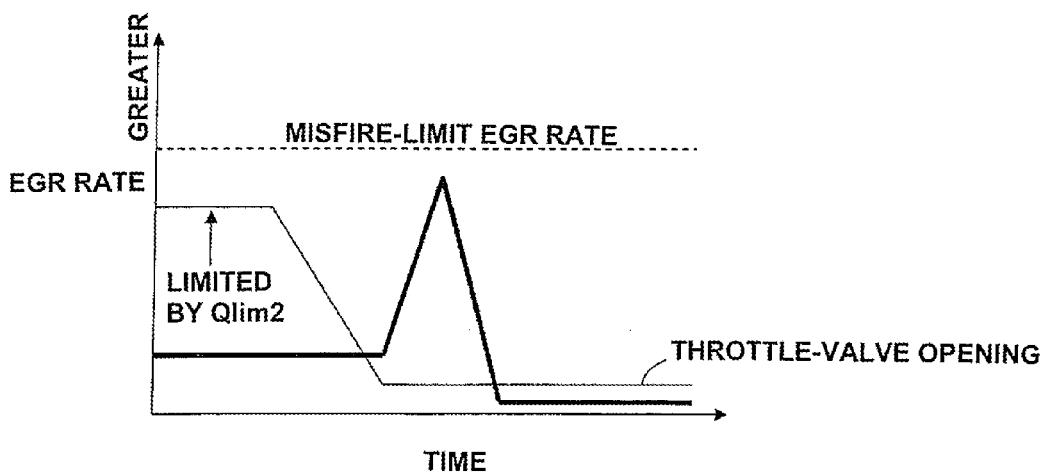
FIG. 4 is a characteristic diagram schematically illustrating an EGR-rate change during deceleration when a limit value Qlim of the intake air amount is set to a prescribed amount Qlim2.
Figure 5:
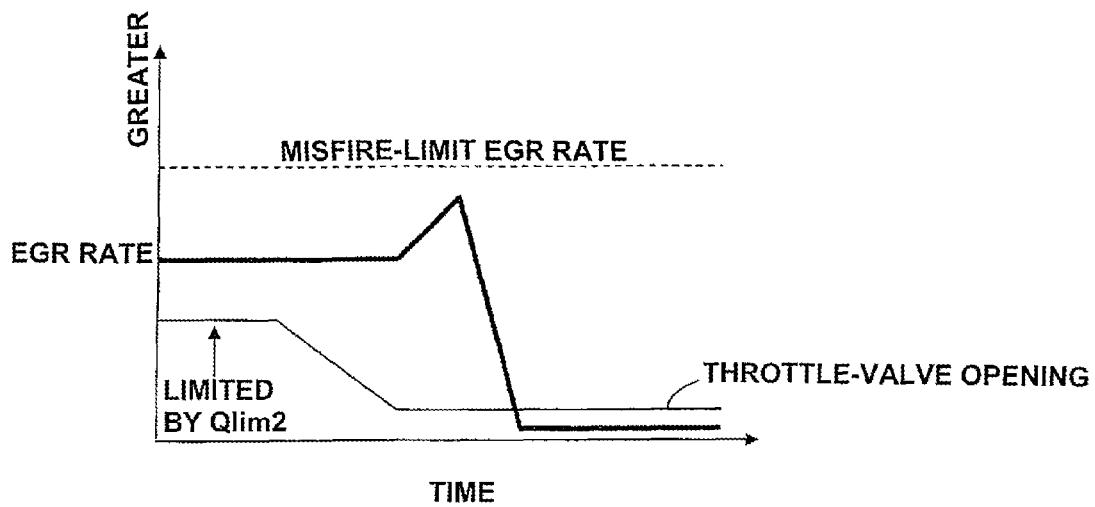
FIG. 5 is another characteristic diagram schematically illustrating an EGR-rate change during deceleration when the limit value Qlim of the intake air amount is set to the prescribed amount Qlim2.

FIGS. 4-5 are two characteristic diagrams each schematically illustrating an EGR-rate change during deceleration when the limit value Qlim of the intake air amount is set to the prescribed amount Qlim2.

Referring to FIG. 4, there is shown the characteristic diagram in a situation where the valve opening degree of the fixing EGR control valve 21 is a second valve opening degree EGRVO2 slightly greater than the first valve opening degree EGRVO1. When the valve opening degree of the fixing EGR control valve 21 is the second valve opening degree EGRVO2, the intake air amount (the throttle valve opening) before deceleration has not been limited so much. Hence, a change in the intake air amount before and after deceleration becomes large, and thus the amount of temporary increase in the deceleration-period EGR rate also becomes large. However, the initial EGR rate itself is small. Therefore, the EGR rate may not exceed the misfire-limit EGR rate.

Referring to FIG. 5, there is shown the characteristic diagram in a situation where the valve opening degree of the fixing EGR control valve 21 is a third vale opening degree EGRVO3 closer to the valve-opening threshold value EGRVOth rather than the first valve opening degree EGRVO1. When the valve opening degree of the fixing EGR control valve 21 is the third valve opening degree EGRVO3, the intake air amount (the throttle valve opening) before deceleration is limited by the prescribed amount Qlim2. Hence, a change in the intake air amount before and after deceleration becomes small, and thus the amount of temporary increase in the deceleration-period EGR rate also becomes small. Therefore, the EGR rate may not exceed the misfire-limit EGR rate.

As explained above, when EGR control valve 21 has been fixed, it is possible to prevent a misfire of internal combustion engine 1 by imposing a limit on the intake air amount so as not to fall the internal combustion engine 1 into a misfire state even during a decelerating period. Hence, it is possible to avoid an engine stall and also to avoid the internal combustion engine 1 from falling into a startup disabled state. Additionally, even when EGR control valve 21 has been fixed, the operation of internal combustion engine 1 is possible, and thus the vehicle, whose driving power source is the internal combustion engine 1, can self-travel safely to a maintenance shop and the like, for the purpose of repairing the fixing (sticking) of EGR control valve 21.

By properly using either the prescribed amount Qlim1 or the prescribed amount Qlim2, both of which are utilized as the limit value Qlim of the intake air amount, depending on the valve opening degree of the fixing EGR control valve 21, assuming that the valve opening degree of the fixing EGR control valve 21 is such a valve opening degree that the EGR rate becomes less than the misfire-limit EGR rate in a steady state, it is possible to improve the output of the internal combustion engine even with the fixing EGR control valve 21, while preventing a misfire of the internal combustion engine which may occur owing to the fixing of EGR control valve 21. Therefore, the smaller the fixed valve opening degree of the fixing EGR control valve 21, the faster that the vehicle can travel to a maintenance shop and the like, for the purpose of repairing the fixing of EGR control valve 21.

By the way, the system may be configured to warn or inform the driver of the fixing EGR control valve for instance by turning a warning lamp ON, when EGR control valve 21 has been fixed. Thereby, it is possible to repair the fixing EGR control valve within a maintenance shop and the like, as soon as possible.

Figure 6:
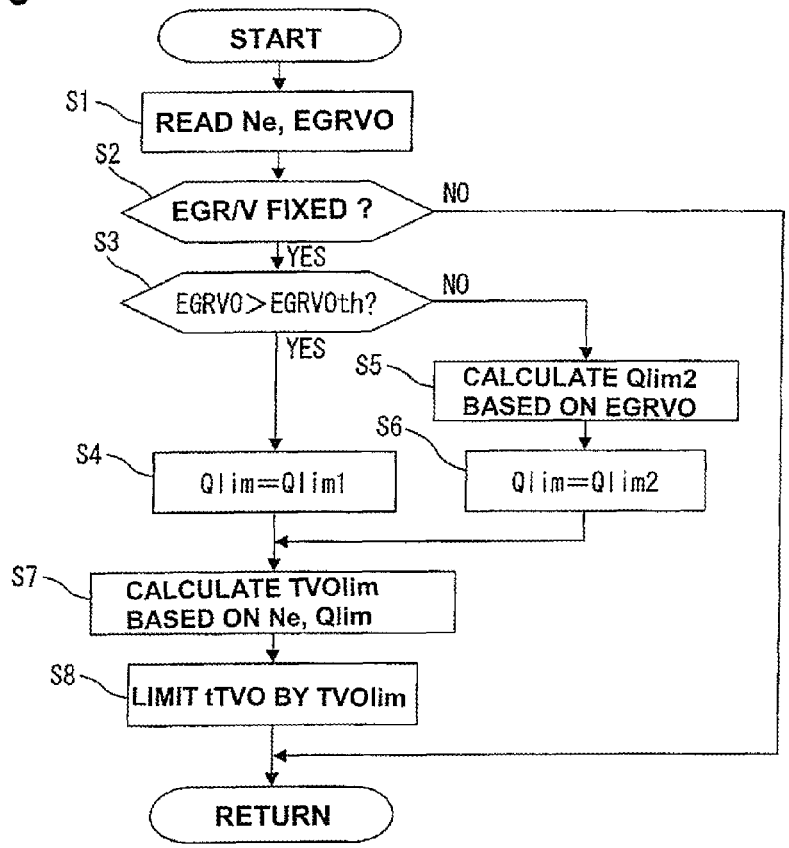
FIG. 6 is a flowchart illustrating one example of control flow for preventing the EGR rate from exceeding a misfire-limit EGR rate.

Referring to FIG. 6, there is shown the flowchart illustrating one example of control flow for preventing the EGR rate from exceeding the misfire-limit EGR rate even when EGR control valve 21 has been fixed. For instance, the control routine shown in FIG. 6 is executed within the control unit 25 as time-triggered interrupt routines to be triggered every predetermined time intervals, during operation of internal combustion engine 1.

At step S1, an engine speed Ne of internal combustion engine 1 and a valve opening degree EGRVO of EGR control valve 21 are read. Engine speed Ne is calculated based on an output signal from the crankangle sensor 26. Valve opening degree EGRVO corresponds to a valve opening degree of EGR control valve 21 detected by the previously-discussed EGR control valve opening sensor 28.

At step S2, a check is made to determine whether EGR control valve 21 is fixed. For instance, a determination of fixing of EGR control valve 21 is made such that it is determined that the EGR control valve 21 is fixed when the detected valve opening degree EGRVO diverges from a target EGR control valve opening degree and the detected valve opening degree EGRVO remains unchanged for a predetermined time. When it is determined that EGR control valve 21 is fixed, the routine proceeds to step S3. Conversely when EGR control valve 21 is not fixed, the current routine terminates.

At step S3, a check is made to determine whether the detected valve opening degree EGRVO of EGR control valve 21 is greater than the valve-opening threshold value EGRVOth. When the detected valve opening degree EGRVO is greater than the valve-opening threshold value EGRVOth, the routine proceeds to step S4. Conversely when the detected valve opening degree EGRVO is less than or equal to the valve-opening threshold value EGRVOth, the routine proceeds to step S5.

At step S4, the limit value Qlim of the intake air amount is set to the prescribed amount Qlim1. Thereby, the upper limit of the intake air amount becomes the prescribed amount Qlim1.

At step S5, the prescribed amount Qlim2 is calculated based on the detected valve opening degree EGRVO of EGR control valve 21. As discussed previously, the prescribed amount Qlim2 is a value set to decrease, as the valve opening degree of the fixing EGR control valve 21 increases. For instance, the prescribed amount Qlim2 is calculated or retrieved from the prescribed amount Qlim2 calculation table, stored in the control unit 25, as shown in FIG. 3. Thereafter, the routine proceeds to step S6. At step S6, the limit value Qlim of the intake air amount is set to the prescribed amount Qlim2.

After this, at step S7, a throttle-valve opening limit value TVOlim, which brings the intake air amount to the limit value Qlim, is calculated based on the engine speed Ne and the limit value Qlim of the intake air amount, set through step S4 or step S6.

At step S8, a target throttle-valve opening degree tTVO, set based on an accelerator-pedal depression amount, is compared to the throttle-valve opening limit value TVOlim, calculated through step S7. When the target throttle-valve opening degree tTVO is greater than the throttle-valve opening limit value TVOlim, the target throttle-valve opening degree tTVO is limited by the throttle-valve opening limit value TVOlim.

That is, when the target throttle-valve opening degree tTVO is greater than the throttle-valve opening limit value TVOlim, throttle valve 5 is controlled, while setting the throttle-valve opening limit value TVOlim at a target throttle opening.

The invention claimed is:

1. In an exhaust gas recirculation apparatus for an internal combustion engine having a supercharger placed on an upstream side of a throttle valve, an EGR passage for recirculating part of exhaust gas back to an upstream side of the supercharger, an EGR control valve disposed in the EGR passage, and an EGR control valve opening degree detection means for detecting a valve opening degree of the EGR control valve,
the exhaust gas recirculation apparatus
configured to recirculate exhaust gas of an amount corresponding to the valve opening degree of the EGR control valve when an intake air amount becomes greater than a prescribed amount and to recirculate a less amount of exhaust gas regardless of the valve opening degree of the EGR control valve when the intake air amount becomes less than or equal to the prescribed amount, and
comprising an exhaust gas recirculation control device comprising:
an EGR-control-valve fixing determination means for determining whether the EGR control valve is fixed; and
an intake air amount limiting means for imposing a limit on the intake air amount so as to prevent the internal combustion engine from falling into a misfire state when the EGR control valve is fixed.

2. The exhaust gas recirculation apparatus for the internal combustion engine as recited in claim 1, wherein:
the intake air amount is limited to the prescribed amount, when the EGR control valve has been fixed with such a valve opening degree that an EGR rate becomes greater than a predetermined misfire-limit EGR rate at which the internal combustion engine misfires.

3. The exhaust gas recirculation apparatus for the internal combustion engine as recited in claim 1, wherein:
the intake air amount is limited to a second prescribed amount greater than the prescribed amount, when the EGR control valve has been fixed with such a valve opening degree that the EGR rate becomes less than or equal to a predetermined misfire-limit EGR rate at which the internal combustion engine misfires.

4. The exhaust gas recirculation apparatus for the internal combustion engine as recited in claim 3, wherein:
the second prescribed amount is set to decrease, as the valve opening degree of the fixed EGR control valve increases.

5. The exhaust gas recirculation apparatus for the internal combustion engine as recited in claim 3, wherein:
the second prescribed amount is set to a maximum intake air amount of the internal combustion engine, when the valve opening degree of the fixed EGR control valve is a minute opening degree.

6. In an internal combustion engine configured to recirculate exhaust gas of an amount corresponding to a valve opening degree of an EGR control valve disposed in an EGR passage back to an upstream side of a supercharger when an intake air amount becomes greater than a prescribed amount and to recirculate a less amount of exhaust gas back to the upstream side of the supercharger regardless of the valve opening degree of the EGR control valve when the intake air amount becomes less than or equal to the prescribed amount,
an exhaust gas recirculation method for the internal combustion engine comprising:
controlling an exhaust-gas-recirculation amount recirculated back to the upstream side of the supercharger by limiting the intake air amount so as to prevent the internal combustion engine from falling into a misfire state when the EGR control valve is fixed.

7. In an exhaust gas recirculation apparatus for an internal combustion engine having a supercharger placed on an upstream side of a throttle valve, an EGR passage for recirculating part of exhaust gas back to an upstream side of the supercharger, an EGR control valve disposed in the EGR passage, and an EGR control valve opening degree detector configured to detect a valve opening degree of the EGR control valve, the exhaust gas recirculation apparatus
configured to recirculate exhaust gas of an amount corresponding to the valve opening degree of the EGR control valve when an intake air amount becomes greater than a prescribed amount and to recirculate a less amount of exhaust gas regardless of the valve opening degree of the EGR control valve when the intake air amount becomes less than or equal to the prescribed amount, and
comprising an exhaust gas recirculation control device comprising:
an EGR-control-valve fixing determination device configured to determine whether the EGR control valve is fixed; and
an intake air amount limiting device configured to impose a limit on the intake air amount so as to prevent the internal combustion engine from falling into a misfire state when the EGR control valve is fixed.

* * * * *